US011428579B2

(12) United States Patent
Newlin et al.

(10) Patent No.: US 11,428,579 B2
(45) Date of Patent: Aug. 30, 2022

(54) HIGH TEMPERATURE CLAMP FOR A SENSING ASSEMBLY

(71) Applicant: Kidde Technologies, Inc., Wilson, NC (US)

(72) Inventors: Scott Kenneth Newlin, Willow Spring, NC (US); Steven Wallace, Raleigh, NC (US); Lawrence A. Coreth, Roanoke Rapids, NC (US); Eric Boros, Raleigh, NC (US); Carl Pardo, Rocky Mount, NC (US); John Galeazzi, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 215 days.

(21) Appl. No.: 16/894,189

(22) Filed: Jun. 5, 2020

(65) Prior Publication Data
US 2021/0381901 A1    Dec. 9, 2021

(51) Int. Cl.
| G01K 1/14 | (2021.01) |
| B64D 45/00 | (2006.01) |
| G01K 13/00 | (2021.01) |
| G01M 3/00 | (2006.01) |
| B64D 13/00 | (2006.01) |
| B64D 27/16 | (2006.01) |
| B64D 41/00 | (2006.01) |

(52) U.S. Cl.
CPC .............. *G01K 1/14* (2013.01); *B64D 45/00* (2013.01); *G01K 13/00* (2013.01); *G01M 3/00* (2013.01); *B64D 13/00* (2013.01); *B64D 27/16* (2013.01); *B64D 41/00* (2013.01); *B64D 2045/009* (2013.01)

(58) Field of Classification Search
CPC ............ G01K 1/14; G01K 13/00; G01M 3/00
See application file for complete search history.

(56) References Cited

U.S. PATENT DOCUMENTS

| 4,234,999 | A | * | 11/1980 | Winter | .................. | F16L 3/1008 |
| | | | | | | 248/74.3 |
| 7,469,575 | B2 | | 12/2008 | Kremer et al. | | |
| 8,306,373 | B2 | | 11/2012 | Xia et al. | | |
| 9,835,041 | B2 | | 12/2017 | Di Vincenzo et al. | | |
| 10,113,479 | B2 | | 10/2018 | Courtial et al. | | |
| 2013/0294900 | A1 | | 11/2013 | Graily et al. | | |
| 2018/0259396 | A1 | | 9/2018 | Rogers et al. | | |
| 2019/0113391 | A1 | * | 4/2019 | Kuppusamy | ........... | G01D 11/10 |
| 2020/0149662 | A1 | * | 5/2020 | Lewis | ..................... | F16L 3/227 |

FOREIGN PATENT DOCUMENTS

| EP | 2844554 A1 | * | 3/2015 | ............. B64C 1/406 |
| EP | 3372846 A1 | * | 9/2018 | ............ F16B 7/0433 |
| FR | 3038689 A1 | | 1/2017 | |

OTHER PUBLICATIONS

Extended European Search Report for EP Application No. 21177616.6, dated Oct. 18, 2021, pp. 1-6.

* cited by examiner

*Primary Examiner* — Jamel E Williams
(74) *Attorney, Agent, or Firm* — Cantor Colburn LLP

(57) ABSTRACT

A sensing assembly comprising includes one or more sensing elements formed as a tube. The sensing assembly also includes one or more clamps to secure the one or more sensing elements. Each of the one or more clamps includes a recess in which each of the one or more sensing elements is seated.

14 Claims, 4 Drawing Sheets

HIGH TEMPERATURE CLAMP FOR A SENSING ASSEMBLY

BACKGROUND

Exemplary embodiments pertain to the art of sensing systems and, in particular, to a high temperature clamp for a sensing assembly.

The arrangement of sensors is complicated by the high operating temperature in certain applications. For example, the arrangement of a fire sensing element for a jet engine must take into account the operating temperature, which may exceed 600 degrees Fahrenheit.

BRIEF DESCRIPTION

In one embodiment, a sensing assembly includes one or more sensing elements formed as a tube, and one or more clamps to secure the one or more sensing elements. Each of the one or more clamps includes a recess in which each of the one or more sensing elements is seated.

Additionally or alternatively, in this or other embodiments, each recess of each of the one or more clamps includes an opening that is a narrowest part of the recess.

Additionally or alternatively, in this or other embodiments, each of the one or more clamps includes a cover configured to prevent the one or more sensing elements from slipping out of the clamp.

Additionally or alternatively, in this or other embodiments, the cover includes a latch to be operated without tools to open and close the cover.

Additionally or alternatively, in this or other embodiments, the sensing assembly also includes a support configured as an interface between the one or more clamps and a structure.

Additionally or alternatively, in this or other embodiments, each of the one or more clamps includes an affixing area to attach the clamp to the support.

Additionally or alternatively, in this or other embodiments, two or more clamps are arranged along an axial length of the support and the support is affixed to the structure.

Additionally or alternatively, in this or other embodiments, one or more clamps are affixed to a structure.

Additionally or alternatively, in this or other embodiments, the one or more sensing elements detect fire, an overheat condition, or bleed air leakage.

Additionally or alternatively, in this or other embodiments, the structure is a jet engine, an auxiliary power unit, or a bleed air duct of an aircraft.

In another embodiment, a method of assembling a sensing assembly includes obtaining one or more sensing elements formed as a tube, and securing the one or more sensing elements within one or more clamps. The securing includes seating each of the one or more sensing elements in a corresponding recess of each of the one or more clamps.

Additionally or alternatively, in this or other embodiments, the securing includes seating each of the sensing elements in the corresponding recess via an opening that is a narrowest part of the recess.

Additionally or alternatively, in this or other embodiments, the method also includes securing a cover of each of the one or more clamps that is configured to prevent the one or more sensing elements from slipping out of the clamp.

Additionally or alternatively, in this or other embodiments, the securing the cover includes using a latch to be operated without tools to open and close the cover.

Additionally or alternatively, in this or other embodiments, the method also includes arranging a support as an interface between the one or more clamps and a structure.

Additionally or alternatively, in this or other embodiments, the method also includes attaching each of the one or more clamps to the support at an affixing area of each of the one or more clamps to form the sensing assembly.

Additionally or alternatively, in this or other embodiments, the method also includes arranging two or more clamps along an axial length of the support and affixing the support to the structure.

Additionally or alternatively, in this or other embodiments, the method also includes affixing one or more clamps to a structure.

Additionally or alternatively, in this or other embodiments, the obtaining the one or more sensing elements includes obtaining a sensor for an overheat condition, a fire, or a bleed air leakage.

Additionally or alternatively, in this or other embodiments, the affixing the one or more clamps to the structure includes affixing the one or more clamps to a jet engine, an auxiliary power unit, or a bleed air duct of an aircraft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, high operating temperatures must be considered in the arrangement of certain sensing elements. In the exemplary case of a fire detector for an aircraft jet engine, the arrangement involves fastening a fire sensing element to the engine. Some prior approaches involve using clamps with a quarter-turn fastener to close the clamp and may be prone to damage if not aligned perfectly or may allow the sensing element to slide out of the clamp. Prior clamps with grommets may withstand temperatures up to 600 degrees Fahrenheit but, as engine temperatures and vibration are increasing, these clamps are no longer viable.

Embodiments of the systems and methods detailed herein relate to a high temperature clamp. The clamp securely holds a sensing element, which is in the form of a tube, in place within the sensing assembly in a high temperature and high vibration application. The clamp may be used to affix a pair of sensing elements directly at or near a target of the sensing or within a sensing assembly. This sensing assembly may then be affixed to the target of the sensing. In an exemplary embodiment, the sensing element is an overheat or fire detector and the target of the sensing is a jet engine of an aircraft or an auxiliary power unit (APU). In this case, one or more clamps or the sensing assembly, which includes a number of clamps securing the sensing element, may be secured to the engine. According to another exemplary embodiment, the sensing element detects bleed air leakage. In this case, one or more clamps or the sensing assembly may be secured to a bleed air duct.

Figure 1:
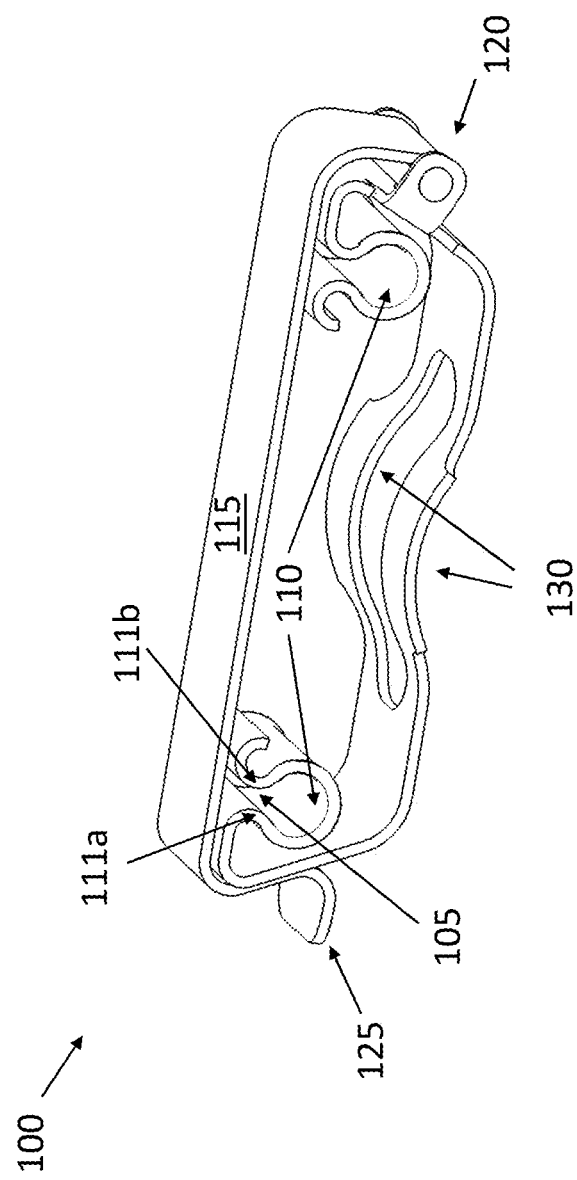
FIG. 1 is an isometric view of a clamp according to one or more embodiments.
Figure 2:
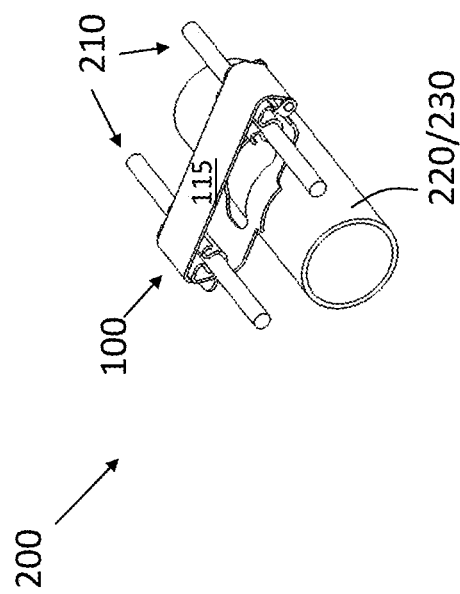
FIG. 2 shows the portion of the sensing assembly with a clamp in a closed position according to one or more embodiments.

FIG. 1 is an isometric view of a clamp 100 according to one or more embodiments. A cover 115 of the clamp 100 includes a hinge 120 on one side and a latch 125 on the other. The cover 115 may be raised (i.e., opened) and lowered (i.e., closed) using the latch 125 as a handle. The latch 125 ensures that the cover 115 remains in place when the cover 115 is closed and latched. The clamp 100 includes two recesses 110 to house two sensing elements 210 (FIG. 2). Each recess 110 is sized according to the sensing element 210 that is secured. While the two recesses 110 are sized identically in the exemplary embodiment shown in FIG. 1, the two recesses 110 may be sized differently and there may be only one or more than two recesses 110. The opening 105 of each recess 110 is the narrowest part of the recess 110.

According to an exemplary embodiment, the opening 105 is flexible (i.e., separable) to allow the sensing element 210 to pass through the opening 105 and be seated in the recess 110. That is, the parts 111a and 111b on either side of the opening 105 that define the opening 105 can be moved apart temporarily to fit the sensing element 210 through the opening 105. According to an alternate embodiment, the opening 105 is wide enough to allow the sensing element 210 to pass. One or more clamps 100 may be welded or otherwise affixed to a support 220 (FIG. 2) to form a sensing assembly 200. Alternately, the clamps 100 may be affixed to a structure 230 (FIG. 2) (e.g., a structure of an aircraft). Examples of structures 230 include a target of the sensing 500 (FIG. 5) (e.g., a jet engine, APU, bleed air duct), another structure sufficiently close to the target of the sensing 500 to facilitate sensing, or a nacelle. One or more affixing locations 130 of the clamp are the areas that are welded or otherwise affixed to the support 220 or structure 230.

Figure 3:
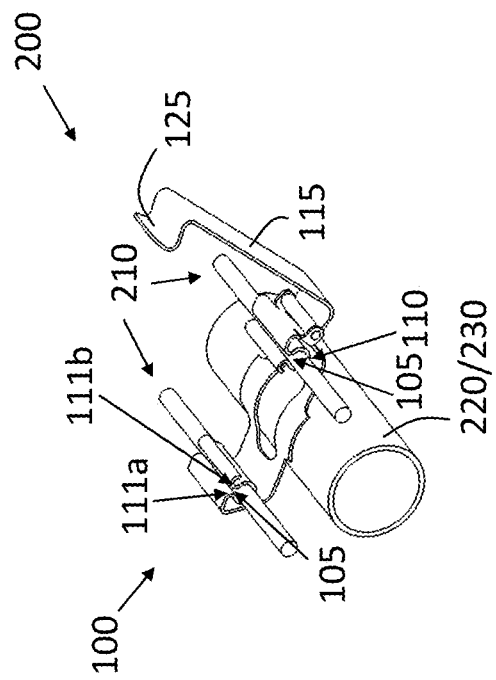
FIG. 3 shows the portion of the sensing assembly with a clamp in an open position according to one or more embodiments.

FIGS. 2 and 3 shows clamp 100 in open and closed positions and affixed to a support 220 or structure 230 according to one or more embodiments. When a support 220 is used rather than a structure 230 of the aircraft, for example, an independent sensing assembly 200 that may be affixed to a structure 230 is formed, as discussed with reference to FIGS. 4 and 5. FIG. 2 shows a clamp 100 in a closed position. Two sensing elements 210 are secured in the recesses 110 of the clamp 100. In an exemplary case of a sensing element 210 being used for detection of a fire or overheat condition or for sensing bleed air leakage, the sensing element may be a known sensor comprising an Inconel or stainless steel tube with a conductor embedded within or a sensor comprising a tube with a gas within. The clamp 100 is affixed to a support 220 or structure 230 that is a tube in the exemplary embodiment.

As shown more clearly in FIG. 1, the affixing locations 130 of the exemplary claim 100 are curved to match the curvature of the tube that is the exemplary support 220 or structure 230. While a tube is shown as the exemplary support 220 or structure 230 of the sensing assembly 200, the support 220 or structure 230 may be formed with any shape as long as the affixing locations 130 are shaped to mate with the support 220. For example, the affixing locations 130 of the clamp 100 may be flat rather than curved, and the support 220 may have any shape (i.e., rectangular, hexagonal) such that one side of the perimeter of the support 220 (i.e., a side that mates with the clamp 100) is also flat. In the exemplary case of one or more clamps 100 being affixed directly to a structure 230 such as a target of the sensing 500 (FIG. 5), for example, the affixing locations 130 may be shaped to match the shape of the surface of the structure 230 to which the clamps 100 are affixed.

FIG. 3 shows the clamp 100 in an open position. The clamp may be opened using the latch 125 without using any tools. As shown, in the open position (i.e., without the cover 115 blocking the space above the opening 105 of each recess 110), each sensing element 210 may be lifted out via the opening 105 of the respective recess 110 in which it is seated without the need for any tools. As previously noted, the opening 105 is defined by the parts 111a and 111b. To seat a sensing element 210 in the recess 110, pressure may be applied with the sensing element 210 in the direction of the recess 110 (i.e., downward according to the orientation shown). The pressure causes the parts 111a and 111b to separate and allow the sensing element 210 to pass through the opening 105 and sit in the recess. To remove the sensing element 210, pressure is applied in the opposite direction (i.e., upward according to the orientation shown) to pull apart the parts 111a and 111b and pull the sensing element 210 out of the recess 110 and past the opening 105.

According to an alternate embodiment, the opening 105 may match the diameter of the sensing element 210 such that the parts 111a and 111b do not need to be separated to insert or remove the sensing element 210. Even in this case, the sensing element 210 cannot inadvertently become unseated from the recess 110, because, in the closed position of the clamp 100, as shown in FIGS. 1 and 2, the cover 115 would prevent the sensing element 210 from slipping out of the recess 110. Further, because the perimeter of the clamp 100 has no gaps, even a sensing element 210 that is unseated from its recess 110 cannot slip out of the clamp 100 altogether.

Figure 4:
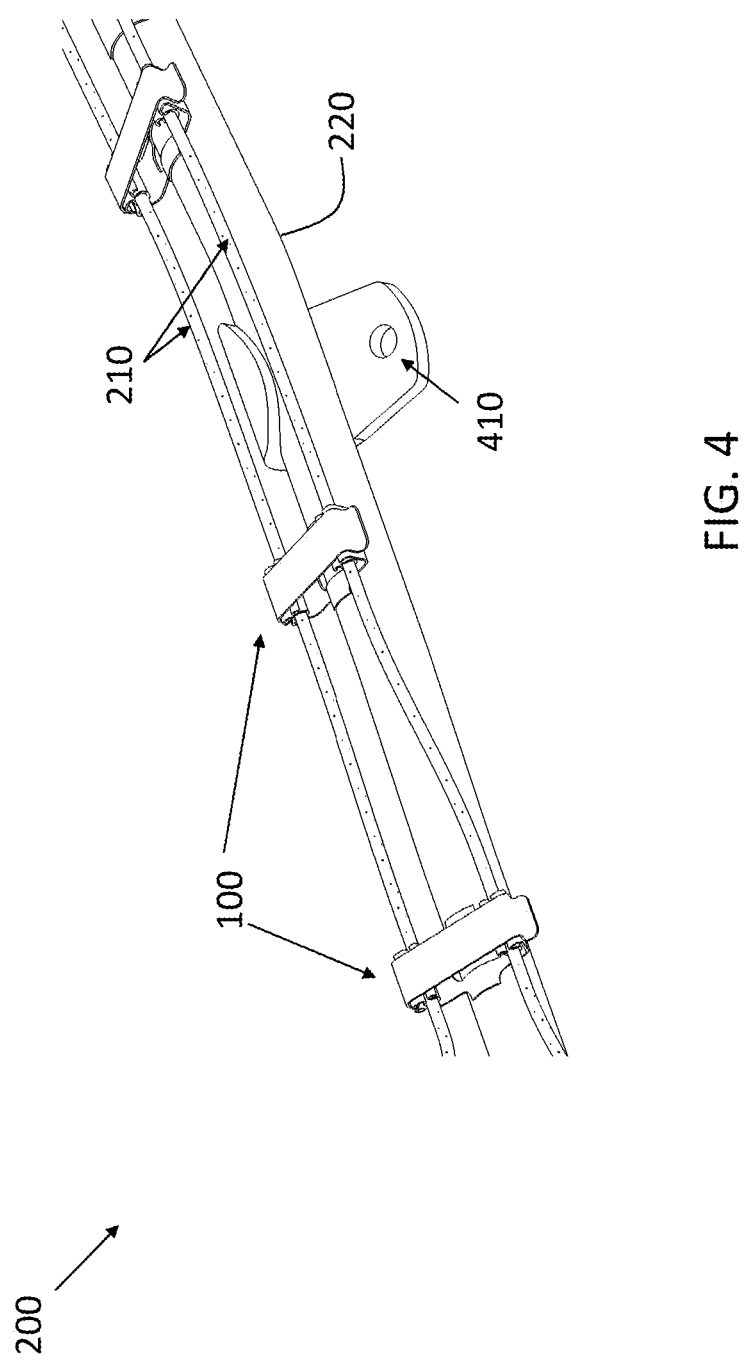
FIG. 4 shows additional aspects of a sensing assembly including clamps according to one or more embodiments.

FIG. 4 shows additional aspects of a sensing assembly 200 including clamps 100 according to one or more embodiments. Three clamps 100 are shown affixed (e.g., soldered) to a support 220. Two sensing elements 210 are secured along the length of the support 220 by the clamps 100. A bracket 410 facilitates securing the sensing assembly 200 to a structure 230 (e.g., target of the sensing 500 shown in FIG. 5) as further discussed with reference to FIG. 5. While one bracket 410 is shown in FIG. 4, a number of brackets 410 may be distributed over the length of the sensing assembly 200. The bracket 410 may be screwed to a structure 230, as shown in FIG. 5, or may be part of a clamp (e.g., P clamp) as another example.

Figure 5:
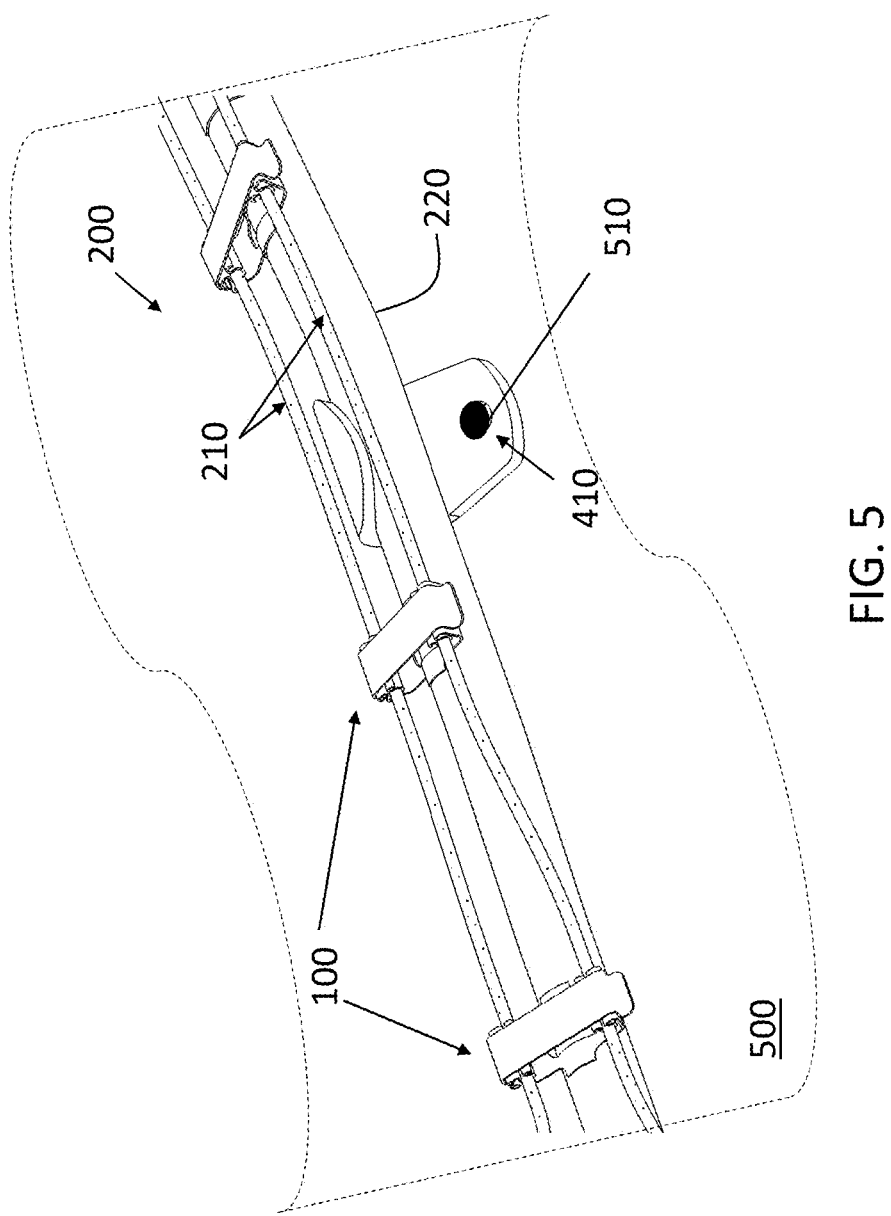
FIG. 5 shows an exemplary embodiment of sensing elements secured via clamps as shown in FIG. 4.

FIG. 5 shows an exemplary embodiment of a sensing assembly 200 affixed to a structure 230 that is a target of the sensing 500. As shown in FIG. 4, the sensing assembly 200 includes sensing elements 210 secured to a support 220 via clamps 100. In the exemplary application involving fire detection or detection of an overheat condition, the target of the sensing 500 may be a jet engine. According to another exemplary application involving detection of bleed air leakage, the target of the sensing 500 may be a bleed air duct. Details of the jet engine or bleed air duct itself are not shown. Aspects of a surface of the target of the sensing 500 that has the sensing assembly 200 affixed are shown. A screw 510 through the bracket 410 of the sensing assembly 200 may go through a portion of the target of the sensing 500, as shown.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensing assembly comprising:
one or more sensing elements formed as a tube; and
one or more clamps configured to secure the one or more sensing elements, wherein each of the one or more clamps includes a recess with two parts defining an opening that is a narrowest part of the recess, the recess being where each of the one or more sensing elements is seated, and each of the one or more clamps also including one cover configured to cover the recess in which each of the one or more sensing elements is seated, wherein the cover includes a latch configured to be operated without tools to open and close the cover and the cover being positioned to block a space above the opening without contacting the two parts.

2. The sensing assembly according to claim 1, further comprising a support configured as an interface between the one or more clamps and a structure.

3. The sensing assembly according to claim 2, wherein each of the one or more clamps includes an affixing area configured to attach the clamp to the support.

4. The sensing assembly according to claim 2, wherein two or more clamps are arranged along an axial length of the support and the support is affixed to the structure.

5. The sensing assembly according to claim 1, wherein one or more clamps are affixed to a structure.

6. The sensing assembly according to claim 5, wherein the one or more sensing elements detect fire, an overheat condition, or bleed air leakage.

7. The sensing assembly according to claim 6, wherein the structure is a jet engine, an auxiliary power unit, or a bleed air duct of an aircraft.

8. A method of assembling a sensing assembly, the method comprising:
forming each of one or more clamps to include a recess with two parts defining an opening that is a narrowest part of the recess and to include one cover configured to cover the recess, wherein forming the cover includes positioning a latch to be operated without tools to open and close the cover and positioning the cover includes the cover blocking a space above the opening without contacting the two parts; and
securing one or more sensing elements within one or more clamps, wherein the securing includes seating each of the one or more sensing elements in a corresponding recess of each of the one or more clamps.

9. The method according to claim 8, further comprising arranging a support as an interface between the one or more clamps and a structure.

10. The method according to claim 9, further comprising attaching each of the one or more clamps to the support at an affixing area of each of the one or more clamps to form the sensing assembly.

11. The method according to claim 10, further comprising arranging two or more clamps along an axial length of the support and affixing the support to the structure.

12. The method according to claim 8, further comprising affixing one or more clamps to a structure.

13. The method according to claim 12, wherein the obtaining the one or more sensing elements includes obtaining a sensor for an overheat condition, a fire, or a bleed air leakage.

14. The method according to claim 13, wherein the affixing the one or more clamps to the structure includes affixing the one or more clamps to a jet engine, an auxiliary power unit, or a bleed air duct of an aircraft.

* * * * *